(12) United States Patent
Klemarczyk et al.

(10) Patent No.: US 6,958,368 B1
(45) Date of Patent: Oct. 25, 2005

US006958368B1

(54) CURE ACCELERATORS FOR ANAEROBIC CURABLE COMPOSITIONS

(75) Inventors: Philp T. Klemarczyk, Canton, CT (US); Karen R. Brantl, West Springfield, MA (US); Andrew D. Messana, Newington, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/157,804

(22) Filed: May 31, 2002

(51) Int. Cl.[7] .................................................. C09J 4/00
(52) U.S. Cl. ..................... 523/176; 524/252; 524/247; 524/257; 526/219.1; 526/219.2; 526/230; 526/218.1; 526/320; 526/321; 526/328; 156/331.1; 156/332
(58) Field of Search ................ 523/176; 524/252, 524/247; 526/219.1, 219.2, 230, 320, 218.1, 321, 328; 156/331.1, 332

(56) References Cited

U.S. PATENT DOCUMENTS

| | | | | |
|---|---|---|---|---|
| 3,218,305 A | * | 11/1965 | Krieble | 526/320 |
| 3,970,505 A | * | 7/1976 | Hauser et al. | 156/331.1 |
| 4,180,640 A | * | 12/1979 | Melody et al. | 526/323.1 |
| 4,287,330 A | * | 9/1981 | Rich | 526/270 |
| 4,321,349 A | * | 3/1982 | Rich | 526/270 |
| 4,764,239 A | | 8/1988 | Jacobine et al. | 156/307.3 |
| 5,021,487 A | * | 6/1991 | Klemarczyk | 524/104 |
| 5,411,988 A | * | 5/1995 | Bockow et al. | 514/560 |
| 5,811,473 A | * | 9/1998 | Ramos et al. | 523/176 |

FOREIGN PATENT DOCUMENTS

| | | | |
|---|---|---|---|
| DE | 1 817 989 | 9/1976 | C09J/5/00 |
| DE | 2 806 701 | 1/1993 | C08L/33/08 |
| JP | 07-308757 | 9/1969 | B01J/00/00 |
| JP | 05-105847 | 6/1991 | |
| JP | 10279888 | * 10/1998 | |
| WO | PCT US98/13704 | 1/1999 | C08F/26/06 |
| WO | WO 00/40664 | 7/2000 | C09J/4/00 |

OTHER PUBLICATIONS

R.D. Rich, "Anaerobic Adhesives" in *Handbook of Adhesive Technology*, 29, 467–79 A. Pizzi and K.L. Mittal, eds., Marcel Dekker, Inc., New York (1994).

F.J. Boerio, et al., "Surface–Enhanced Raman Scattering from Model Acrylic Adhesive Systems", American Chemical Society (1990).

* cited by examiner

*Primary Examiner*—Tatyana Zalukaeva
(74) *Attorney, Agent, or Firm*—Steven C. Bauman

(57) ABSTRACT

The present invention relates to new cure accelerators for anaerobic curable compositions. These anaerobic cure accelerators are generally sulfinimides and oxygen and sulfur derivatives thereof, sulfonimides and oxygen and sulfur derivatives thereof, sulfonamides and oxygen and sulfur derivatives thereof, and oxygen and sulfur analogues of sulfimides.

13 Claims, 6 Drawing Sheets

CURE ACCELERATORS FOR ANAEROBIC CURABLE COMPOSITIONS

BACKGROUND OF THE INVENTION

1. Field of the Invention

The present invention relates to new cure accelerators for anaerobic curable compositions. These anaerobic cure accelerators are generally sulfinimides and oxygen and sulfur derivatives thereof, sulfonimides and oxygen and sulfur derivatives thereof, sulfonamides and oxygen and sulfur derivatives thereof, and the oxygen and sulfur analogues of sulfimides.

2. Brief Description of Related Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH have been used as standard cure accelerator components in anaerobic adhesive cure systems since the inception of the technology, and has been well studied in that connection. Hitherto, it was believed that the nitrogen-hydrogen bond off the heterocycle ring was nessecary to achieve performance under anaerobic conditions, as early studies substituting the hydrogen with an alkyl group proved to be ineffective. See F. J. Boerio et al., "Surface-Enhanced Raman Scattering from Model Acrylic Adhesive Systems", Langmuir, 6, 721–27 (1990), in which it is stated "[t]hese salts [of saccharin] are thought to be important factors in the curing reaction of the adhesive."

And while anaerobic curable compositions having cure components including saccharin, DE-p-T and cumene hydroperoxide ("CHP") display good performance on metal substrates, such compositions do not display as impressive performance on glass substrates. Thus, there exists a specific need to tailor anaerobic curable compositions to perform well on such substrates.

There is an on-going desire to find alternative technologies for accelerating the cure of anaerobic curable compositions to differentiate existing products and provide supply assurances in the event of shortages or cessation of supply of raw materials. Accordingly, it would be desirable to identify new materials, which function as accelerators in the cure of anaerobic curable compositions.

SUMMARY OF THE INVENTION

The present invention provides new cure accelerators for anaerobic curable compositions. The anaerobic curable compositions are typically used as adhesives or sealants.

The anaerobic cure accelerators are generally sulfinimides and oxygen and sulfur derivatives thereof, sulfonimides and oxygen and sulfur derivatives thereof, sulfonamides and oxygen and sulfur derivatives thereof, and the oxygen and sulfur analogues of sulfimides. For instance, the inventive cure accelerators may be within structure I

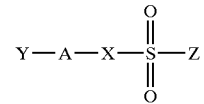

wherein Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from within structure I.

The addition of these materials into anaerobic curable compositions as a replacement for some or all of the amount of conventional anaerobic cure accelerators (such as o-benzoic sulfimide or saccharin, used interchangeably throughout) surprisingly provides at least comparable cure speeds and physical properties for the reaction products formed therefrom.

This invention also provides anaerobic curable compositions and anaerobic curable composition systems prepared with such cure accelerators, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

Figure 1:
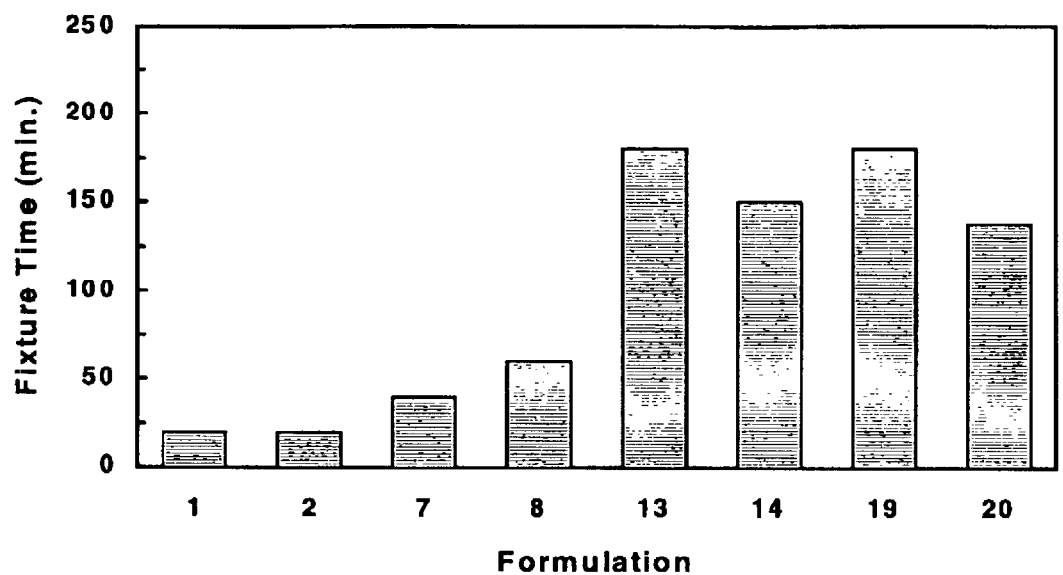
FIG. 1 depicts a bar chart of fixture times of DE-p-T/DM-o-T containing anaerobic curable compositions, with saccharin (as a control), D-p-TS, BBTS, or MBTS, with and without methacrylic acid.

The present invention provides anaerobic cure accelerators, which are generally sulfinimides and oxygen and sulfur derivatives thereof, sulfonimides and oxygen and sulfur derivatives thereof, sulfonamides and oxygen and sulfur derivatives thereof, and the oxygen and sulfur analogues of sulfimides. The addition of such compounds as cure accelerators into anaerobic curable compositions as a replacement for some or all of the amount of conventional cure accelerators, namely saccharin, surprisingly provides at least comparable cure speeds and physical properties for the reaction products formed.

The inventive anaerobic cure accelerators may be represented below within structure I:

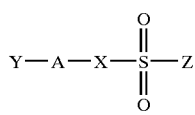

where Y is an aromatic ring, such as a phenyl containing one, like phenyl, biphenyl or diphenyl methane or diphenyl isopropane, optionally substituted at up to five positions by $C_{1-6}$ alkyl or alkoxy, or halo groups; A is C=O, S=O or O=S=O; X is NH, O or S and Z is an aromatic ring, such as a phenyl containing one, like phenyl, biphenyl or diphenyl methane or diphenyl isopropane, optionally substituted at up to five positions by $C_{1-6}$ alkyl or alkoxy, or halo groups, or Y and Z taken together may join to the same aromatic ring, such as phenyl, biphenyl or diphenyl methane or diphenyl isopropane, optionally substituted at up to five positions by $C_{1-6}$ alkyl or alkoxy, or halo groups or aromatic ring system, such as biphenyl, diphenyl methane, diphenyl isopropane, naphthalene, anthracene, or phenanthracene, provided that when X is NH, o-benzoic sulfimide is excluded from within structure I.

More specifically, Y is a phenyl or an alkyl substitued phenyl; A is C=O or O=S=O; X is NH, O or S and Z is a phenyl or an alkyl substitued phenyl. Alternatively, Y and Z taken together may join to the same aromatic ring system at positions noted, such as any of those set forth in structures A through G below:

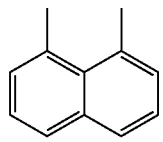
A

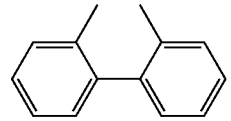
B

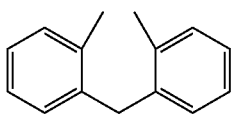
C

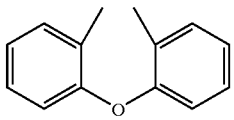
D

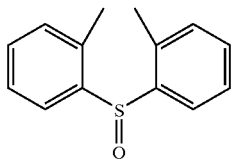
E

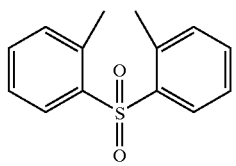
F

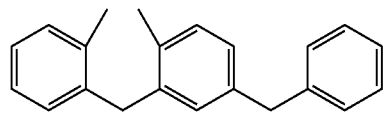
G

Particular examples of such accelerators include the following sulfonimides, sulfonamides, and oxygen and sulfur analogues of benzoic sulfimides:

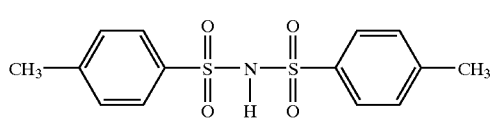
Di-p-tolulsufonimide (D-p-TS)

II

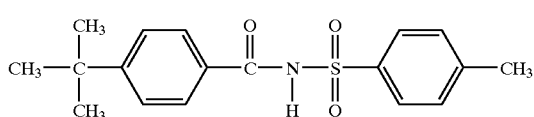
t-Butylbenzoyl Toluylsulfonamide (BBTS)

III

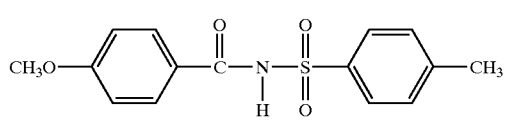
Methoxybenzoyl Toluylsulfonamide (MBTS)

IV

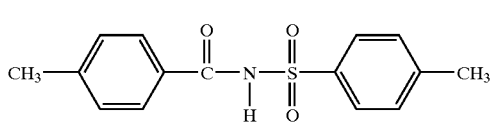

Methoxybenzoyl Toluylsulfonamide (MeBTS)

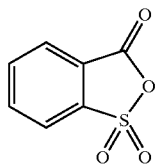

Sulfobenzoic Acid Cyclic
Anhydride (SBCA)

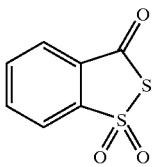

3H-1,2-Benzodithiol-3-one-
1,1-dioxide (BDTD)

Saccharin is o-benzoic sulfimide. The oxygen analog is structure VI, 2-sulfobenzoic acid cyclic anhydride ("SBCA"); the sulfur analog is structure VIII, 3H-1,2-benzodithiol-3-one-1,1-dioxide ("BDTD"). Like the sulfinimides, sulfonamides and sulfonimides, these saccharin analogues are useful in, or as primers for use with, anaerobic curable compositions as a replacement for some of or all of the saccharin typically used as an accelerator. The saccharin analogues display good solubility, stability and anaerobic activity in anaerobic curable compositions. The saccharin analogues display particularly good activity on glass and aluminum fixtures, and with nut and bolt assemblies.

Anaerobic curable compositions generally are based on a (meth)acrylate component, together with an anaerobic cure-inducing composition. In the present invention, such anaerobic curable compositions are desirably substantially free of saccharin and include the inventive cure accelerators within structure I.

(Meth)acrylate monomers suitable for use as the (meth)acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, other free radical co-accelerators, inhibitors of free radical generation, as well as metal catalysts, such as iron and copper.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional co-accelerators of free radical polymerization may also be used in conjunction with the inventive anaerobic cure accelerators. Such co-accelerators are typically of the hydrazine variety (e.g., APH), as disclosed in the '330 and '349 patents.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

The inventive anaerobic cure accelerators may be used in amounts of about 0.1 to about 5 percent by weight, such as about 1 to about 2 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 2 percent by weight.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate. Or, the inventive anaerobic cure accelerator may be used as a primer itself. See e.g. U.S. Pat. No. 5,811,473 (Ramos).

In addition, this invention provides a method of preparing an anaerobic curable composition, a step of which includes mixing together a (meth)acrylate component and an anaerobic cure-inducing composition, desirably substantially free of saccharin, including the inventive anaerobic cure accelerator within structure I.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a cure accelerator for anaerobic curable compositions compounds within structure I.

And the present invention provides a method of using an anaerobic cure accelerator within structure I as a replacement for some or all of the saccharin as a cure accelerator for anaerobic curable compositions. Of the course, the present invention also provides for a bond formed between two mated substrates with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate certain sulfinimides and oxygen and sulfur derivatives thereof, sulfonimides and oxygen and sulfur derivatives thereof, sulfonamides and oxygen and sulfur derivatives thereof, and oxygen and sulfur analogues of sulfimides, as a replacement for some or all of saccharin in anaerobic curable compositions.

These new cure systems were compared with control formulations containing the conventional cure components, APH and saccharin by 82° C. accelerated stability, fixture time, and one hour/24 hour adhesion tests on nut/bolt specimens.

One sulfonimide—II—, and three sulfonamides—III, IV, and V—were prepared and evaluated to determine their suitability as a cure accelerator in the anaerobic adhesives. And two sulfimides analogues—VI and VII—were prepared and evaluated to determine their suitability as a cure accelerator in anaerobic adhesives.

Figure 10:
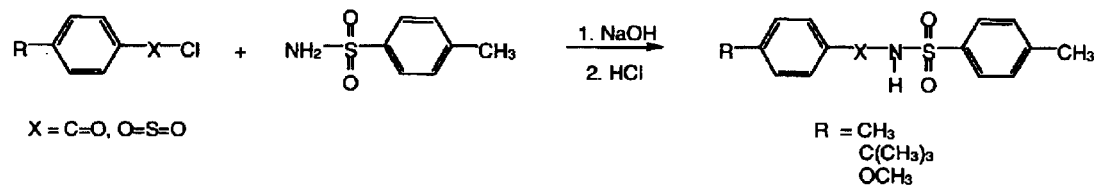
FIG. 10 depicts a synthetic scheme to prepare the sulfonimidies and sulfonamides used in the inventive compositions.

The inventive sulfonimide and sulfonamide anaerobic cure accelerators were prepared in accordance with the synthetic scheme depicted in FIG. 10, and as described below. The inventive sulfimides analogues were obtianed commercially from Aldrich Chemical Co., as were p-toluene sulfonamide, p-methoxy benzoyl chloride, 4-t-butyl benzoyl chloride, TRIEGMA, TMPTMA, methacrylic acid ("MA"), saccharin, DE-p-T, DM-o-T, CHP, and APH.

Proton Nuclear Magnetic Resonance ("$^1$H NMR") analyses were performed using a Varian 300 Hz Gemini Spectrophotometer. Infrared ("IR") spectral analyses were performed on neat samples using an ATI Mattson Genesis series FTIR. A Fisher Accumet pH meter was used for the pH measurements. Melting points were obtained on a TA Instrument 2920 Differential Scanning Calorimeter.

A. General Synthesis for Toluylsulfinimides, Toluylsulfonimides and Toluylsulfonamides To a 500 mL four-neck reaction flask, equipped with a nitrogen inlet, mechanical stirrer, heating mantle, pH meter, condenser, and thermocouple-temperature controller, may be added p-toluene-sulfinimide, p-toluene-sulfonamide or p-toluene-sulfonimide (25 g, 144 mmol) and 5 wt. % aq. NaOH (127 mL, 158 mmol). The mixture forms a solution, and is heated to a temperature of 50–80° C. with stirring. To this solution is added the aromatic carbonyl, sulfoxyl or sulfonyl chloride (158 mmol) in 5 g portions over a one hour period of time. The pH of the solution is maintained at a level greater than 7.2, with the addition of small amounts of 5 wt. % aq. NaOH solution. After the addition is complete, the reaction mixture is stirred for a period of time of about 30 minutes. To the solution is added 50% aq. NaOH (7 mL, 90 mmol), and the reaction mixture is stirred for a period of time of about one hour. The solution is then cooled to ice bath temperature, and the sodium salt of the sulfinimide, sulfonamide or sulfonimide precipitates. The sodium salt is filtered, washed with 100 ml of 5 wt. % aq. NaOH, and dried in a vacuum oven at a temperature of 90° C.

To a 250 mL beaker, equipped with a mechanical stirrer, is added the sodium salt of the sulfinimide, sulfonamide or sulfinamide (79 mmol) and 125 mL of deionized water. A 7.4 wt. % solution of aq. HCl (50 mL, 108 mmol) is added dropwise with stirring over a period of time of 20 minutes. A thick, white precipitate forms during the addition. After the addition is complete, the reaction mixture is stirred for a period of time of 30 minutes, and the product is filtered. The product is washed five times with 50 mL each of deionized water and vacuum dried at a temperature of 100° C. until a constant weight is obtained.

BBTS, MBTS and MeBTS were prepared in this manner. BBTS, III—Yield=22.4 g (52%); M.P. (DSC)=203–205° C.; $^1$H NMR (CDCl$_3$) δ 12.4 (br s, 1, N—H), 7.8 (dd, 4, Ar—H), 7.4 (dd, 4, Ar—H), 1.3 (s, 9, CH$_3$); IR (KBr) 3570, 3296, 1699, 1599, 1431, 1335, 1169 cm$^{-1}$.

MBTS, IV—Yield=28.3 g (72%); M.P. (DSC)=124–128° C.; $^1$H NMR (CDCl$_3$) δ 12.6 (br s, 1, N—H), 7.9 (d, 2, Ar—H), 7.7 (d, 2, Ar—H), 7.4 (d, 2, Ar—H), 7.0 (d, 2, Ar—H), 3.9 (s, 3, OCH$_3$), 2.4 (s, 3, CH$_3$); IR (KBr) 3357, 1699, 1549, 1431, 1416, 1304 cm$^{-1}$.

MeBTS, V—Yield=10.0 g (27%); M.P. (DSC)=139–144° C.; $^1$H NMR (CDCl$_3$) δ 12.4 (br s, 1, N—H), 7.8 (dd, 4, Ar—H), 7.3 (dd, 4, Ar—H), 2.4 (s, 3, CH$_3$), 2.3 (s, 3, CH$_3$); IR (KBr) 3296, 1699, 1599, 1431, 1335, 1169 cm$^{-1}$.

B. Adhesive Formulations with Benzoylsulfonamides/Benzoylsulfonimides

Sample Nos. 1–24 were prepared from the noted components in the listed amounts, by mixing with a mechanical stirrer in glass vials. Each sample included a chelator and naphthaquinone as stabilizers.

TABLE 1

Formulations for the Controls

| COMPONENTS | | Sample No./(Amt./phr) | | | | | |
|---|---|---|---|---|---|---|---|
| Type | Identity | 1 | 2 | 3 | 4 | 5 | 6 |
| (Meth)-acrylate | TRIEGMA | 50 | 50 | 50 | 50 | 50 | 50 |
| | TMPTMA | 50 | 50 | 50 | 50 | 50 | 50 |
| Conventional Co-Accelerator | Saccharin | 1 | 1 | 1 | 1 | 1 | 1 |
| Conventional Accelerator | APH | — | — | 1 | 1 | 1 | 1 |
| Toluidines | DE-p-T | 0.7 | 0.7 | — | — | 0.7 | 0.7 |
| | DM-o-T | 0.35 | 0.35 | — | — | 0.35 | 0.35 |
| Peroxide | CHP | 1 | 1 | 1 | 1 | 1 | 1 |
| Acid | Maleic | — | — | — | — | 1 | 1 |
| | (Meth)acrylic | — | 5 | — | 5 | — | 5 |

TABLE 2

D-p-TS Anaerobic Formulations

| COMPONENTS | | Sample No./(Amt./phr) | | | | | |
|---|---|---|---|---|---|---|---|
| Type | Identity | 7 | 8 | 9 | 10 | 11 | 12 |
| (Meth)-acrylate | TRIEGMA | 50 | 50 | 50 | 50 | 50 | 50 |
| | TMPTMA | 50 | 50 | 50 | 50 | 50 | 50 |
| Inventive Co-Accelerator | D-p-TS | 1.78 | 1.78 | 1.78 | 1.78 | 1.78 | 1.78 |
| Toluidines | DE-p-T | 0.7 | 0.7 | — | — | 0.7 | 0.7 |
| | DM-o-T | 0.35 | 0.35 | — | — | 0.35 | 0.35 |
| Peroxide | CHP | 1 | 1 | 1 | 1 | 1 | 1 |
| Conventional Accelerator | APH | — | — | 1 | 1 | 1 | 1 |
| Acid | Maleic | — | — | — | — | 1 | 1 |
| | (Meth)-acrylic | — | 5 | — | 5 | — | 5 |

TABLE 3

BBTS Anaerobic Formulations

| COMPONENTS | | Sample No./(Amt./phr) | | | | | |
|---|---|---|---|---|---|---|---|
| Type | Identity | 13 | 14 | 15 | 16 | 17 | 18 |
| (Meth)-acrylate | TRIEGMA | 50 | 50 | 50 | 50 | 50 | 50 |
| | TMPTMA | 50 | 50 | 50 | 50 | 50 | 50 |
| Inventive Co-Accelerator | BBTS | 1.81 | 1.81 | 1.81 | 1.81 | 1.81 | 1.81 |
| Toluidines | DE-p-T | 0.7 | 0.7 | — | — | 0.7 | 0.7 |
| | DM-o-T | 0.35 | 0.35 | — | — | 0.35 | 0.35 |
| Peroxide | CHP | 1 | 1 | 1 | 1 | 1 | 1 |

TABLE 3-continued

BBTS Anaerobic Formulations

| COMPONENTS | | Sample No./(Amt./phr) | | | | | |
|---|---|---|---|---|---|---|---|
| Type | Identity | 13 | 14 | 15 | 16 | 17 | 18 |
| Conventional Accelerator | APH | — | — | 1 | 1 | 1 | 1 |
| Acid | Maleic | — | — | — | — | 1 | 1 |
| | (Meth)-acrylic | — | 5 | — | 5 | — | 5 |

TABLE 4

MBTS Anaerobic Formulations

| COMPONENTS | | Sample No./(Amt./phr) | | | | | |
|---|---|---|---|---|---|---|---|
| Type | Identity | 19 | 20 | 21 | 22 | 23 | 24 |
| (Meth)-acrylate | TRIEGMA | 50 | 50 | 50 | 50 | 50 | 50 |
| | TMPTMA | 50 | 50 | 50 | 50 | 50 | 50 |
| Inventive Co-Accelerator | MBTS | 1.67 | 1.67 | 1.67 | 1.67 | 1.67 | 1.67 |
| Toluidines | DE-p-T | 0.7 | 0.7 | — | — | 0.7 | 0.7 |
| | DM-o-T | 0.35 | 0.35 | — | — | 0.35 | 0.35 |
| Peroxide | CHP | 1 | 1 | 1 | 1 | 1 | 1 |
| Conventional Accelerator | APH | — | — | 1 | 1 | 1 | 1 |
| Acid | Maleic | — | — | — | — | 1 | 1 |
| | (Meth)-acrylic | — | 5 | — | 5 | — | 5 |

C. Physical Properties

Shelf Life Stability

The 82° C. stability of the formulations was determined according to an evaluation in which the formulation is judged to have acceptable shelf stability if the adhesive formulation remains liquid for 3.5 hours or longer at 82° C.

The formulations demonstrated acceptable shelf life stability.

Fixture Times

Two drops of each sample were applied to the threads of a degreased ⅜×16 mild steel bolt, and a mild steel nut was assembled onto the bolt. Five nut and bolt specimens were assembled for each sample. The time required for the sample to cure sufficiently to enable the assembled specimen to resist loosening by turning with the fingers was then recorded. The average fixture time of the five specimens was calculated and recorded as the fixture time for that sample.

Figure 2:
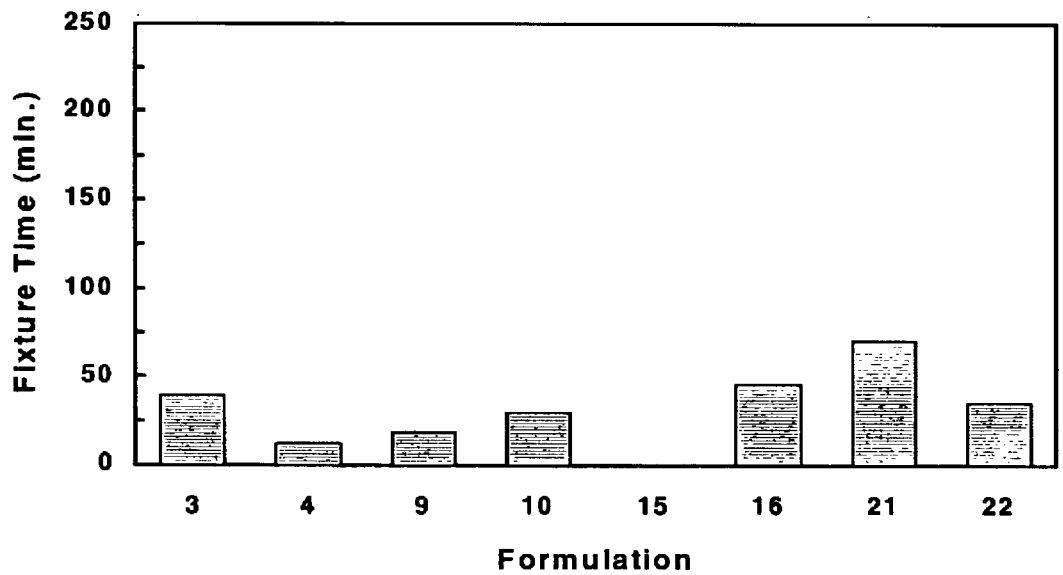
FIG. 2 depicts a bar chart of fixture times of APH containing anaerobic curable compositions, with saccharin, D-p-TS, BBTS, or MBTS, with and without methacrylic acid. The fixture time was observed to be greater than 960 minutes for Sample No. 15.
Figure 3:
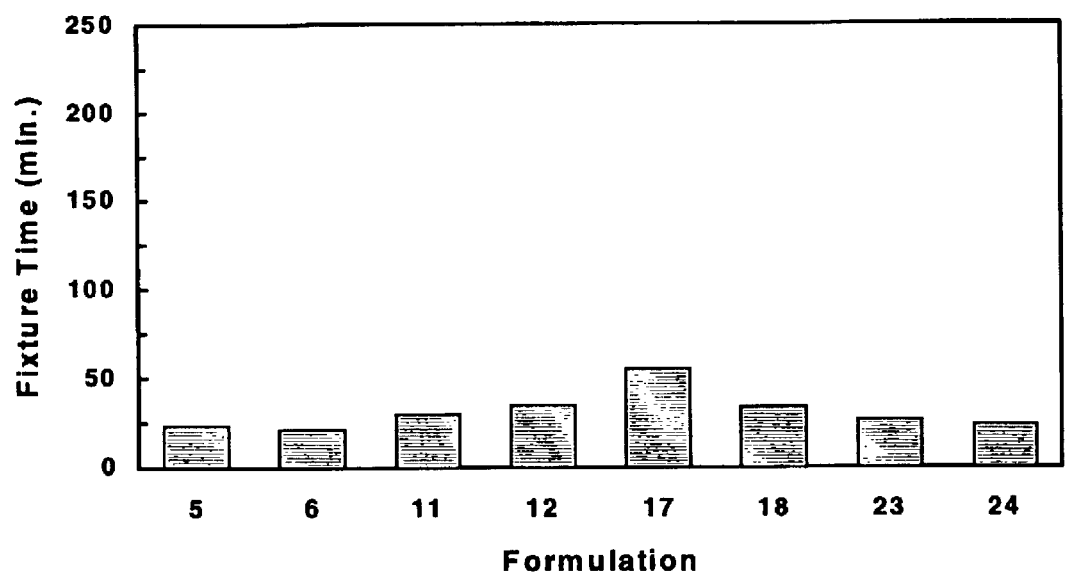
FIG. 3 depicts a bar chart of fixture of times APH/DE-p-/DM-o-T containing anaerobic curable compositions, with saccharin, D-p-TS, BBTS, or MBTS, with and without methacrylic acid.
Figure 4:
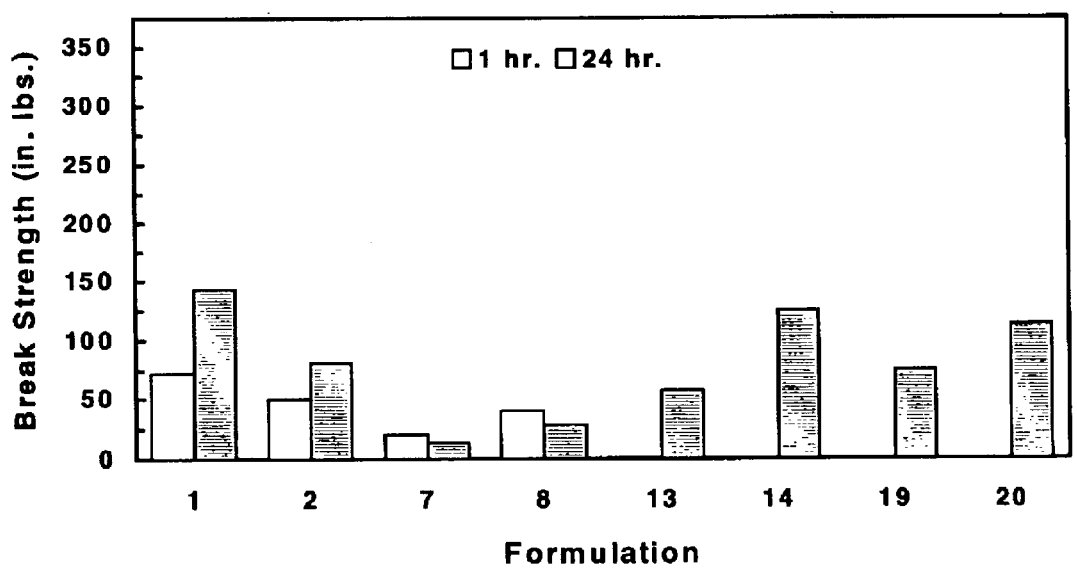
FIG. 4 depicts a bar chart showing one-hour and 24-hour break strengths of DE-p-T/DM-o-T containing anaerobic curable compositions with saccharin, D-p-TS, BBTS, or MBTS, with and without methacrylic acid. The one hour break strengths were observed to be zero for Sample Nos. 13, 14, 19 and 20.
Figure 5:
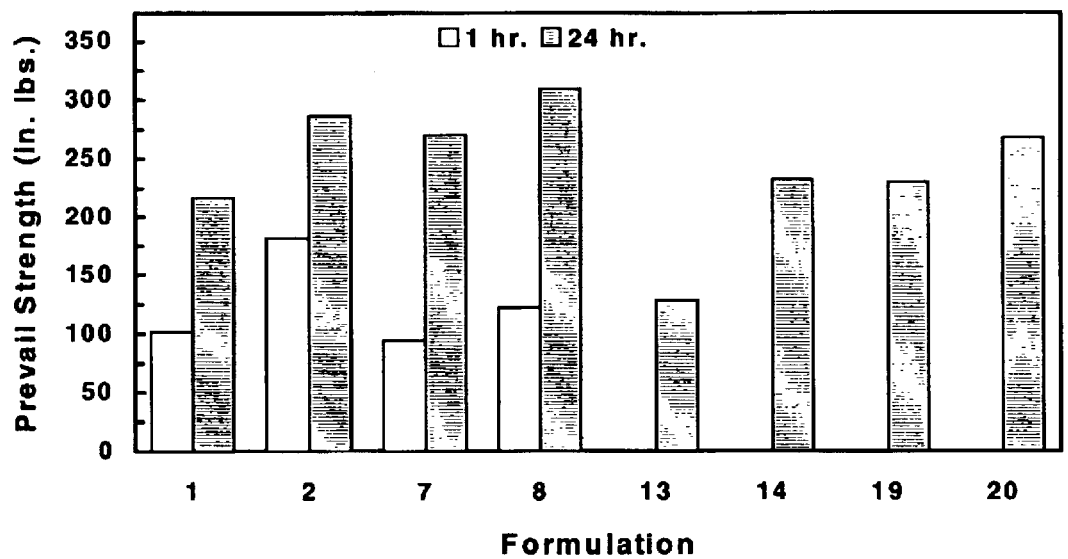
FIG. 5 depicts a bar chart of one-hour and 24-hour prevail strengths of DE-p-T/DM-o-T containing anaerobic curable compositions with saccharin, D-p-TS, BBTS, or MBTS, with and without methacrylic acid. The one hour prevail strengths were observed to be zero for Sample Nos. 13, 14, 19 and 20.
Figure 6:
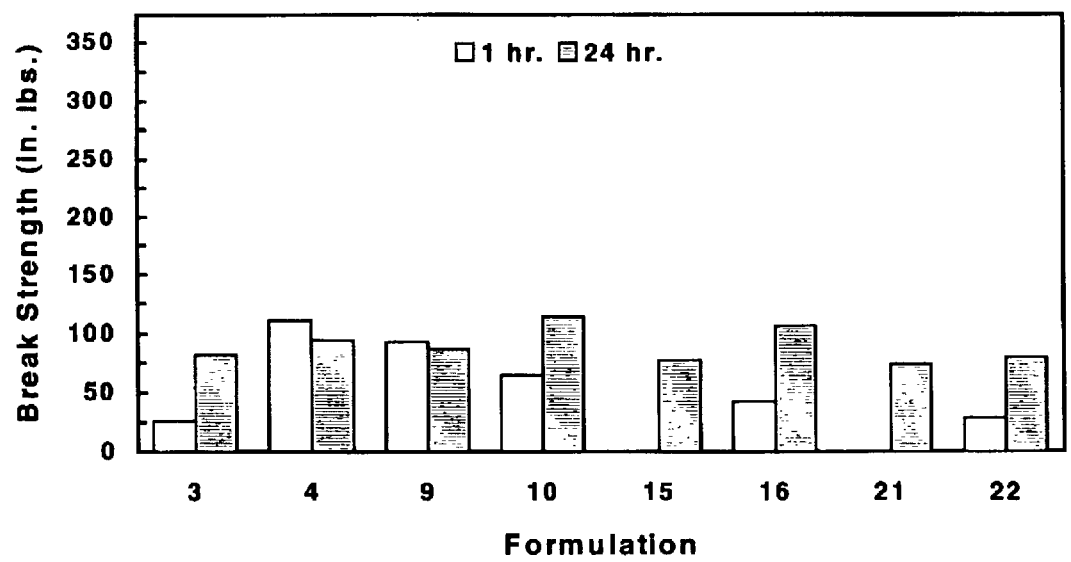
FIG. 6 depicts a bar chart of one-hour and 24-hour break strengths of APH containing anaerobic curable compositions with saccharin, D-p-TS, BBTS, or MBTS, with and without methacrylic acid. The one hour break strengths were observed to be zero for Sample Nos. 15 and 21.
Figure 7:
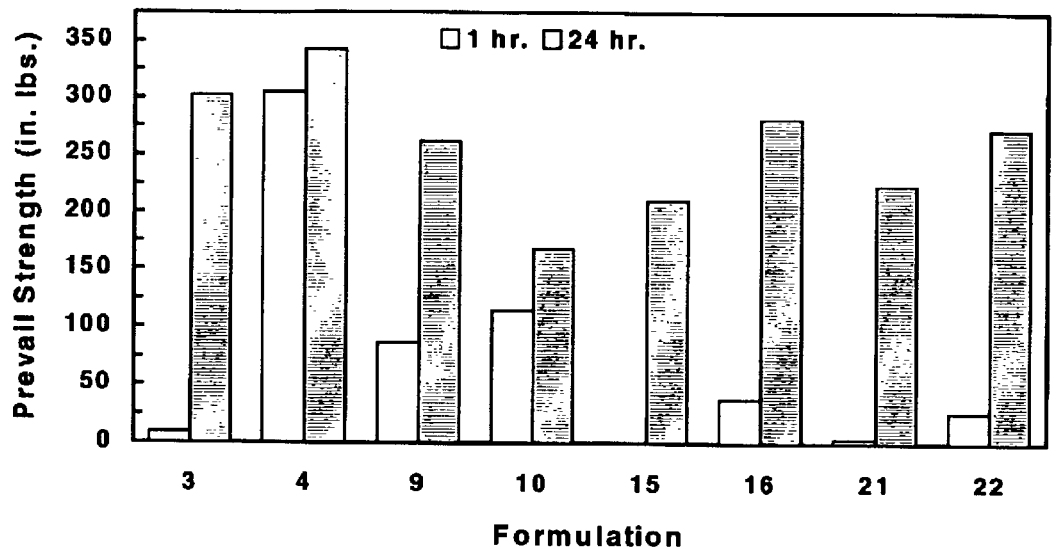
FIG. 7 depicts a bar chart of one-hour and 24-hour prevail strengths of APH containing anaerobic curable compositions with saccharin, D-p-TS, BBTS, or MBTS, with and without methacrylic acid. The one hour prevail strength was observed to be zero for Sample No. 15.
Figure 8:
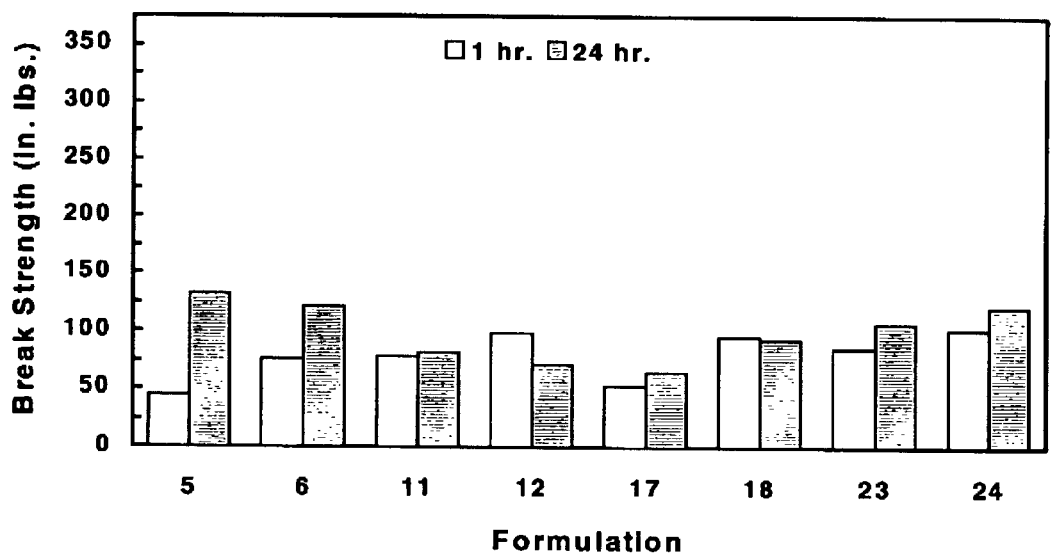
FIG. 8 depicts a bar chart showing one-hour and 24-hour break strengths of APH/DE-p-T/DM-o-T containing anaerobic curable compositions with saccharin, D-p-TS, BBTS or MBTS, with and without methacrylic acid.
Figure 9:
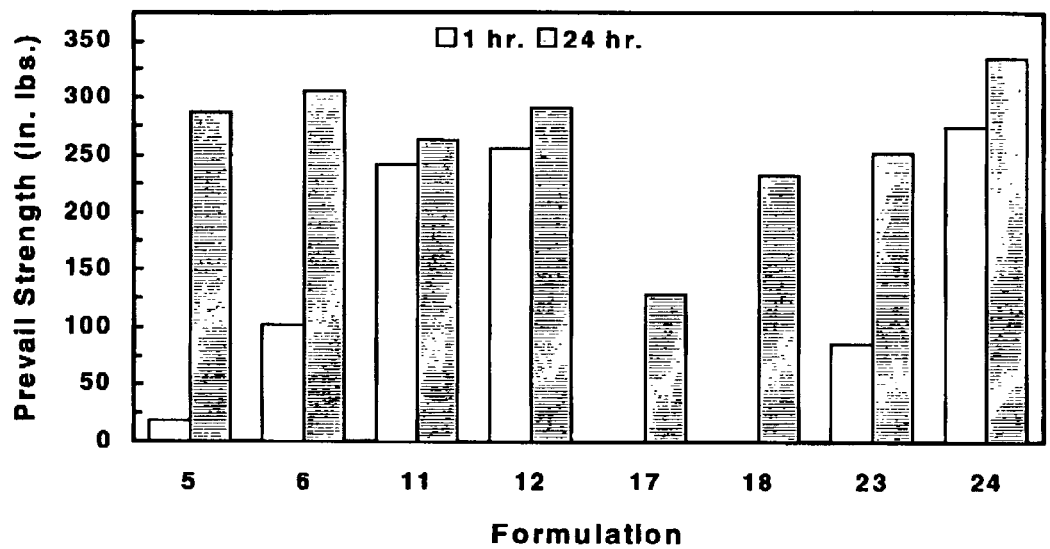
FIG. 9 depicts a bar chart of one-hour and 24-hour prevail strengths of APH/DE-p-T/DM-o-T containing anaerobic curable compositions with saccharin, D-p-TS, BBTS, or MBTS, with and without methacrylic acid. The one hour prevail strengths were observed to be zero for Sample Nos. 17 and 18.

Fixture times of the samples set forth in Tables 5–8 on steel nut/bolt specimens are depicted in FIGS. 1–3.

One-Hour and 24-Hour Break and Prevail Strengths

For the break/prevail adhesion tests, the specimens were maintained at ambient temperature for 1 hour and 24 hours after assembly and were tested as follows.

The break and prevail torque strengths were observed and recorded for half of the specimens after one hour at ambient temperature and after 24 hours at ambient temperature for the remaining specimens. The torque strengths were measured on a calibrated automatic torque analyzer.

The data for these evaluations is set forth below in Tables 5–8, and depicted in FIGS. 4–9.

TABLE 5

Data for the Controls

| Physical Property | Sample No. | | | | | |
|---|---|---|---|---|---|---|
| | 1 | 2 | 3 | 4 | 5 | 6 |
| Fixture Time (min.) | 20 | 20 | 39 | 12 | 23 | 21 |
| Break Strength 1 hr. (in. lbs.) | 73 | 50 | 26 | 111 | 45 | 77 |
| Break Strength 24 hrs. (in. lbs.) | 143 | 81 | 83 | 94 | 133 | 122 |
| Prevail Strength 1 hr. (in. lbs.) | 102 | 181 | 10 | 304 | 18 | 103 |
| Prevail Strength 24 hrs. (in. lbs.) | 216 | 287 | 302 | 343 | 287 | 306 |

TABLE 6

Data for D-p-TS Formulations

| Physical Property | Sample No. | | | | | |
|---|---|---|---|---|---|---|
| | 7 | 8 | 9 | 10 | 11 | 12 |
| Fixture Time (min.) | 39 | 60 | 18 | 29 | 29 | 34 |
| Break Strength 1 hr. (in. lbs.) | 20 | 41 | 93 | 64 | 79 | 98 |
| Break Strength 24 hrs. (in. lbs.) | 14 | 29 | 87 | 115 | 83 | 72 |
| Prevail Strength 1 hr. (in. lbs.) | 94 | 123 | 261 | 168 | 241 | 256 |
| Prevail Strength 24 hrs. (in. lbs.) | 270 | 309 | 292 | 383 | 263 | 290 |

TABLE 7

Data for BBTS Formulations

| Physical Property | Sample No. | | | | | |
|---|---|---|---|---|---|---|
| | 13 | 14 | 15 | 16 | 17 | 18 |
| Fixture Time (min.) | 180 | 150 | >960 | 45 | 55 | 33 |
| Break Strength 1 hr. (in. lbs.) | 0 | 0 | 0 | 43 | 52 | 96 |
| Break Strength 24 hrs. (in. lbs.) | 57 | 125 | 78 | 107 | 65 | 93 |
| Prevail Strength 1 hr. (in. lbs.) | 0 | 0 | 0 | 38 | 0 | 0 |
| Prevail Strength 24 hrs. (in. lbs.) | 129 | 232 | 210 | 281 | 129 | 232 |

TABLE 8

Data for MBTS Formulations

| Physical Property | Sample No. | | | | | |
|---|---|---|---|---|---|---|
| | 19 | 20 | 21 | 22 | 23 | 24 |
| Fixture Time (min.) | 180 | 138 | 70 | 35 | 26 | 23 |
| Break Strength 1 hr. (in. lbs.) | 0 | 0 | 1 | 29 | 86 | 102 |
| Break Strength 24 hrs. (in. lbs.) | 75 | 113 | 74 | 80 | 108 | 122 |
| Prevail Strength 1 hr. (in. lbs.) | 0 | 0 | 4 | 26 | 86 | 252 |

TABLE 8-continued

Data for MBTS Formulations

| Physical Property | Sample No. | | | | | |
|---|---|---|---|---|---|---|
| | 19 | 20 | 21 | 22 | 23 | 24 |
| Prevail Strength 24 hrs. (in. lbs.) | 229 | 267 | 223 | 271 | 273 | 334 |

The one-hour and 24-hour break and prevail strengths of the various samples were comparable to the control sample. More specifically, these data indicate that the sulfonamide and sulfonimide anaerobic cure accelerators in accordance with this invention functioned in anaerobic (meth)acrylate-based adhesives at room temperature like traditional anaerobic (meth)acrylate-based adhesives when applied and cured on the substrates.

D. Adhesive Formulations with Oxygen and Sulfur Analogues of Cyclic Sulfimides

Two saccharin analogues—SBCA and BDTD—were identified and studied in anaerobic curable compositions. The results of this study indicate that the saccharin analogues displayed comparable, and in some cases enhanced, physical properties as controlled to saccharin, when evaluated at comparable weight percent under comparable conditions. One particularly interesting observation was the enhanced performance with glass substrates.

Each saccharin analogue was substituted for saccharin with DE-p-T and CHP as shown in Table 9.

TABLE 9

| COMPONENTS | | Sample No./Amt. (phr) | | |
|---|---|---|---|---|
| Typ | Id ntity | 25 | 26 | 27 |
| (Meth)acrylate | PEG 200 DMA | 70 | 70 | 70 |
| | PEG 200 MO | 30 | 30 | 30 |
| Conventional Co-Accelerator | Saccharin | 4.3 | — | — |
| Inventive Accelerator | SBCA | — | 4.3 | — |
| | BDTD | — | — | 0.43 |
| Toluidines | DE-p-T | 0.9 | 0.9 | 0.9 |
| Peroxide | CHP | 2 | 2 | 2 |

E. Physical Properties

Solubility and stability observations of the samples were made visually. SBCA appears to have both good solubility the (meth)acrylate monomer chosen and stability, while BDTD appears to have good solubility and fair stability at low levels or when in combination with only DE-p-T.

Fixture Times

Reactivity for Sample Nos. 25–27 was measured using fixture time on glass slides. Sample Nos. 25–27 were applied in an amount of about 100 mg on glass substrates in one instance and in a second instance applied on glass substrates with copper metal in an amount of about 3–4 mg as well. These resulyts are illustrated in the first and second rows of data, respectively, in Table 10.

It was surprising to observe that SBCA, VI, and BTDT, VII, perform at least as well as or even better than saccharin in the anaerobic cure system. It has long been thought that one of the reasons for saccharin's effectiveness in the anaerobic adhesive cure system is its weak acidity, because of the presence of an acidic H atom, which is attached to the N atom. It has been proven that an acid-base reaction occurs on metal surfaces between saccharin and the metal to form a metal salt, as shown below,

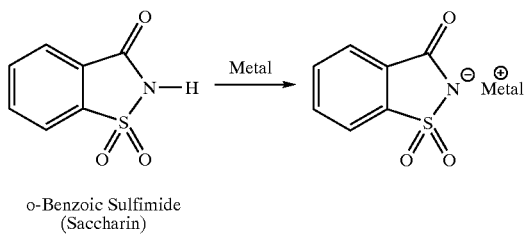

o-Benzoic Sulfimide
(Saccharin)

which assists in initiating cue of the anaerobic adhesive (see F. J. Boerio, et al.). However, the possibility for such an acid-base reaction does not exist for VI or VII, because neither material contains an analogous acidic H atom.

Figure 11:
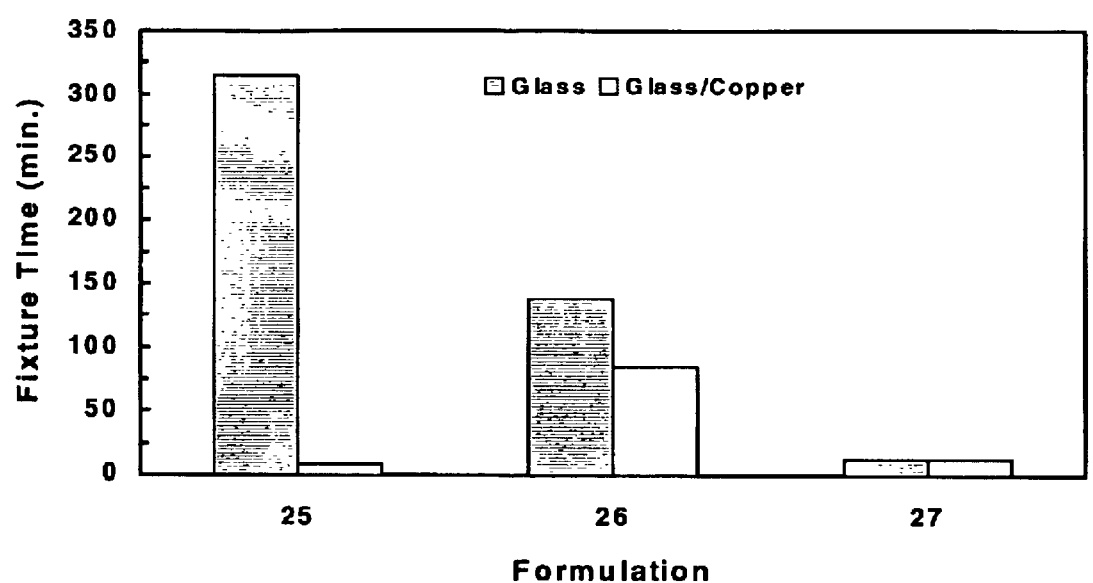
FIG. 11 depicts a bar chart of fixture times on glass slides of DE-p-T/CHP containing anaerobic curable compositions, with saccharin, SBCA, or BDTD, with and without copper.

It is also surprising that VI and VII are more effective in the anaerobic cure system on glass substrates. Anaerobic adhesives are known to cure rapidly on metal substrates, such as iron or copper, and tend to be somewhat slower on more inert substrates, such as glass. However, both VI and VII when used in anaerobic curable compositions produce adhesives (Sample Nos. 26 and 27), which cure more rapidly on glass than the adhesive with saccharin (Sample No. 25). In addition, Sample No. 27 cures as rapidly on glass alone as with the presence of copper metal, as seen in Table 10 and with reference to FIG. 11.

TABLE 10

| Sample No./secs. | | |
|---|---|---|
| 25 | 26 | 27 |
| 315 | 138 | 12 |
| 8 | 85 | 12 |

These analogues are useful in anaerobic curable compositions as a replacement for some of or all of the saccharin typically used as an accelerator. The saccharin analogues display good solubility, stability and anaerobic activity. The analogues display particularly good activity on glass fixtures. CHP tends to inhibit the anaerobic activity of SBCA and accelerates the activity of BDTD. DE-p-T tends to augment the effectiveness of SBCA and improve the activity of BDTD, when combined with CHP.

Both analogues have accelerated activity when in combination with DE-p-T and CHP, rendering each useful to replace some or all saccahrin.

While the present invention has been described herein by way of illustration and examples, it will be clear to those persons of skill in the art that changes and modifications may be made from the specific description without departing from the spirit and scope of the present invention defined by claims.

What is claimed is:

1. An anaerobic curable composition, comprising:

(a) a (meth)acrylate component;
    (b) an anaerobic cure-inducing composition substantially free of saccharin; and
    (c) an anaerobic cure accelerator compound within structure I

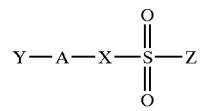

wherein Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to taken together may join to the same aromatic ring or aromatic ring system, provided that when X is NH, o-benzoic sulfimide is excluded from structure I.

2. The composition according to claim 1, wherein the (meth)acrylate component is represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

3. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. The composition according to claim 1, wherein the anaerobic cure accelerator is a member selected from the group consisting of

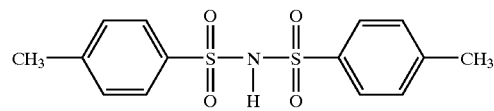

Di-p-tolulsufonimide (D-p-TS)

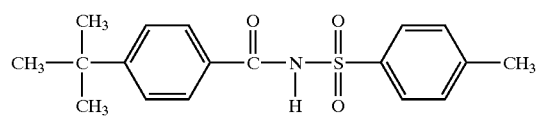

t-Butylbenzoyl Toluylsulfonamide (BBTS)

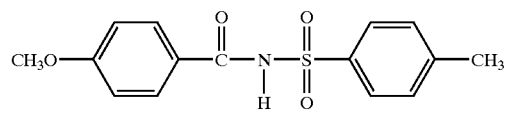

Methoxybenzoyl Toluylsulfonamide (MBTS)

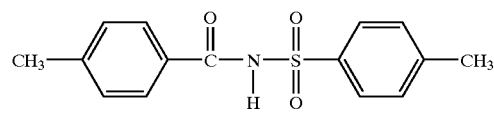

Methoxybenzoyl Toluylsulfonamide (MeBTS).

5. The composition according to claim 1, wherein the accelerator is a member selected from the group consisting of

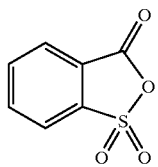

Sulfobenzoic Acid Cyclic Anhydride (SBCA)

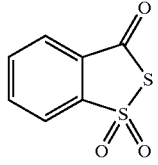

3H-1,2-Benzodithiol-3-one-1,1-dioxide (BDTD).

6. The composition according to claim 1, further comprising a peroxide compound.

7. Reaction products of the composition according to claim 1.

8. A process for preparing a reaction product from an anaerobic curable composition, comprising the steps of:

apply an anaerobic curable composition according to claim 1, to a desired substrate surface and exposing the composition to an anaerobic environment for a time sufficient to cure the composition.

9. A method of preparing an anaerobic curable composition, comprising the step of:

mixing together:

a (meth)acrylate component, an anaerobic cure inducing composition substantially free of saccharin and an anaerobic cure accelerator compound in accordance with claim 1.

10. The composition according to claim 1, wherein the anaerobic cure-inducing composition comprises the combination of a free radical initiator and a free radical co-accelerator.

11. A method of using an anaerobic cure accelerator compound in accordance with claim 1, comprising either:

(I) mixing the anaerobic cure accelerator compound in an anaerobic curable composition; or (II) applying onto a surface of a substrate the anaerobic cure accelerator compound and applying thereover an anaerobic curable composition.

12. An anaerobic curable composition, consisting essentially of:

(a) a (meth)acrylate component;

(b) an anaerobic cure-inducing composition; and (c) an anaerobic cure accelerator compound in accordance with claim 1; and (d) optionally, one or more additives selected from the group consisting of free radical initiators, free radical co-accelerators, free radical inhibitors, metal catalysts, thickneners, non-reactive plasticizers, fillers, and toughening agents.

13. A bond formed between two mated substrates with the composition of claim 1.

* * * * *